US012673724B2

(12) United States Patent
Wuebbolt-Gorbatenko

(10) Patent No.: US 12,673,724 B2
(45) Date of Patent: Jul. 7, 2026

(54) WHEEL MODULE FOR A MOTOR VEHICLE

(71) Applicant: Schaeffler Technologies AG & Co. KG, Herzogenaurach (DE)

(72) Inventor: Benjamin Wuebbolt-Gorbatenko, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 576 days.

(21) Appl. No.: 18/025,006

(22) PCT Filed: Aug. 11, 2021

(86) PCT No.: PCT/DE2021/100688
§ 371 (c)(1),
(2) Date: Mar. 7, 2023

(87) PCT Pub. No.: WO2022/053102
PCT Pub. Date: Mar. 17, 2022

(65) Prior Publication Data
US 2023/0322299 A1     Oct. 12, 2023

(30) Foreign Application Priority Data

Sep. 9, 2020     (DE) ..................... 10 2020 123 524.0

(51) Int. Cl.
*B62D 7/06*          (2006.01)
*B60K 7/00*          (2006.01)
(Continued)

(52) U.S. Cl.
CPC .............. *B62D 7/06* (2013.01); *B60K 7/0007* (2013.01); *B62D 1/12* (2013.01); *B62D 5/04* (2013.01); *B62D 7/20* (2013.01)

(58) Field of Classification Search
CPC .. B60G 2200/44; B60G 2500/40; B62D 7/06; B62D 7/20
See application file for complete search history.

(56) References Cited

U.S. PATENT DOCUMENTS 6,484,839 B2 * 11/2002 Cole ........................ B62D 7/20
                                                                  180/402
11,148,493 B2 * 10/2021 Riedel ..................... B60G 3/06
(Continued)

FOREIGN PATENT DOCUMENTS

CN          107139669 A     9/2017
CN          206679065 U     11/2017
(Continued)

OTHER PUBLICATIONS

Christian Seibert, Tie rod and steering lever for vehicles and other machines, May 14, 1998, EPO, DE 19 646 509 A1, Machine Translation of Description (Year: 1998).*
(Continued)

*Primary Examiner* — James A English

(57) ABSTRACT

The disclosure relates to a wheel module of a motor vehicle that includes a wheel and a steering lever assembly for transferring a steering movement to the wheel. The steering lever assembly can be rotatably mounted on a support frame of the motor vehicle. A steering actuator for introducing a steering movement is connected to the steering lever assembly. The steering actuator is in form of a linear actuator. The steering lever assembly has a main lever connected to the steering actuator by means of a first connection region, and a steering lever connected to the main lever by means of an intermediate lever.

18 Claims, 3 Drawing Sheets

(51) Int. Cl.
B62D 1/12 (2006.01)
B62D 5/04 (2006.01)
B62D 7/20 (2006.01)

(56) References Cited

U.S. PATENT DOCUMENTS

| | | | | |
|---|---|---|---|---|
| 2003/0218374 A1* | 11/2003 | Kress | ........................ | B60P 1/16 |
| | | | | 298/17 R |
| 2006/0096800 A1* | 5/2006 | Saibold | .................... | B62D 7/09 |
| | | | | 280/93.502 |
| 2009/0045004 A1 | 2/2009 | Panizzolo | | |
| 2019/0283801 A1* | 9/2019 | Fehr | ........................ | B62D 7/20 |
| 2020/0070881 A1 | 3/2020 | Durkovic | | |
| 2021/0316783 A1* | 10/2021 | Lawson, Jr. | ............ | B62D 7/06 |

FOREIGN PATENT DOCUMENTS

| | | |
|---|---|---|
| CN | 110091917 A | 8/2019 |
| DE | 4129645 A1 | 3/1993 |
| DE | 19646509 A1 * | 5/1998 ............... B62D 7/20 |
| DE | 102004038409 A1 | 8/2005 |
| DE | 102004053722 A1 | 5/2006 |
| DE | 102004053772 A1 | 5/2006 |
| DE | 60310787 T2 | 10/2007 |
| DE | 102014102510 A1 | 9/2014 |
| DE | 102016211385 A1 | 12/2017 |
| DE | 102016217773 A1 | 3/2018 |
| EP | 1340670 A1 * | 9/2003 ........... B62D 7/1509 |
| EP | 2998203 A1 | 3/2016 |
| EP | 3265364 A1 | 1/2018 |
| EP | 3265364 B1 | 1/2019 |
| WO | 0181153 A1 | 11/2001 |
| WO | 2019185090 A1 | 10/2019 |

OTHER PUBLICATIONS

Christian Berger, Independent wheel module and vehicle using such a module, Sep. 3, 2003, EPO, EP 1 340 670 A1, Machine Translation of Description (Year: 2003).*

* cited by examiner

WHEEL MODULE FOR A MOTOR VEHICLE

CROSS-REFERENCE TO RELATED APPLICATIONS

This application is the U.S. National Phase of PCT Application No. PCT/DE2021/100688 filed on Aug. 11, 2021, which claims priority to DE 10 2020 123 524.0 filed on Sep. 9, 2020, the entire disclosures of which are incorporated by reference herein.

TECHNICAL FIELD

The disclosure relates to a wheel module for a motor vehicle.

BACKGROUND

A motor vehicle with a wheel module is known from CN 206679065 U, in which a wheel of the wheel module can be rotated by 90° about a vertical steering axis for parking the motor vehicle, even in narrow parking spaces.

DE 10 2016 211 385 A1 describes a transverse steering arrangement that enables a steering angle of 90 degrees. The steering process is made possible by means of a steering actuator. A rotary steering actuator is used for this.

DE 10 2016 217 773 A1 describes a steering device for a vehicle having an actuator. This is provided to apply an axial force to a connecting rod and to interact with a respective tie rod. The respective tie rod is articulated to a respective steering lever, wherein the respective steering lever is operatively connected to a respective wheel carrier in order to steer a respective wheel of a vehicle axle in accordance with an axial movement of the connecting rod.

DE 10 2004 038 409 A1 discloses a steering axle with two turntables on what are termed removable pistons. These are coupled to a steering drive for control.

DE 10 2014 102 510 A1 discloses a wheel suspension for motor vehicles having an actuator. The actuator is arranged on a first side of a frame. Each independent suspension is each configured to support a vehicle wheel and has a respective steering knuckle. Actuation of the steering actuator urges each corresponding steering knuckle to rotate.

There is a constant need for a motor vehicle to achieve a large steering angle in a small installation space.

SUMMARY

The object of the present disclosure is to provide a wheel module which allows a large steering angle for a motor vehicle in a small installation space.

According to the disclosure, this object is achieved by a wheel module of a motor vehicle, comprising a wheel, a steering lever assembly for transferring a steering movement to the wheel, which steering lever assembly can be rotatably mounted on a support frame of the motor vehicle, and to which steering lever assembly a steering actuator for introducing a steering movement is connected; wherein the steering actuator is in the form of a linear actuator; and wherein the steering lever assembly has a main lever, which is connected to the steering actuator by means of a first connection region, and a steering lever, which is connected to the main lever by means of an intermediate lever.

In the wheel module according to the disclosure, a linear actuator is provided as the steering actuator. Compared to the prior art, this has the advantage that less installation space is required and, in addition, the cost-intensive use of a backlash-free rotary gear can be dispensed with. In order to enable large steering angles at the same time as well as saving installation space, the steering angle acts on the steering lever via a main lever and an intermediate lever, which enables a turning in of the wheel module. This means that the linear movement of the steering actuator is converted into a pivoting movement of the main lever and is transmitted to the steering lever via the intermediate lever. As a result, the steering lever performs a pivoting movement, causing the wheel module to turn in. In particular, the steering actuator is only intended to actuate the wheel of the wheel module, so that each wheel module of the motor vehicle can be actuated individually. Alternatively, a steering actuator can actuate two wheel modules via the described kinematics and thus the steering angle on a vehicle axle, which is formed from two wheel modules, can be adjusted In order to enable a corresponding turning in, according to one embodiment of the disclosure, the steering actuator is rotatably mounted with one of its ends on the support frame or on another component of the vehicle. The other end is connected to the main lever. The steering actuator can be designed as an electromechanical actuator. This means that the steering actuator has an electrical machine for delivering an electrically generated steering torque.

According to one embodiment of the disclosure, the main lever is rotatably connected indirectly to a second connection area on a support frame or another component of the vehicle.

The main lever can have an axis of rotation between the first and the second connection region, wherein the intermediate lever is connected to this axis of rotation. This means that the intermediate lever is connected to the main lever at a connection point along the axis of rotation. The position of the axis of rotation is defined using a lever distance from the axis of rotation to the second connection area. Due to the offset connection of the intermediate lever, a transmission or reduction between the movement from the main lever to the steering lever can be achieved via the lever distance. The smaller the lever distance selected, the larger the transmission ratio.

According to one embodiment of the disclosure, the steering lever is pivotably connected to the intermediate lever at a connection point with a steering axle of the wheel in a non-rotatable manner.

The steering lever assembly can be rotated through a steering angle α of at least 130°. This enables particularly tight corners to be driven. It is even easily possible to drive with the motor vehicle not only essentially in longitudinal direction, but even in transverse direction. This makes it possible to park in a particularly narrow parking space without a maneuvering distance in the longitudinal direction.

According to one embodiment of the disclosure, an electrically drivable wheel hub drive is provided on or in the wheel. The wheel hub drive can be integrated into the wheel and arranged radially within a tire of the wheel so that no additional installation space is required due to the wheel hub drive. The wheel hub drive enables the wheel of the wheel module to be driven separately. In particular, multiple wheel modules can be provided for a multi-lane passenger vehicle, which can each be driven individually by the respective wheel hub drive. This enables particularly high flexibility in the direction of travel of the motor vehicle and/or enables a particularly small turning radius. The wheel hub drive can also be used to recuperate braking energy in order to generate electrical energy when the wheel is braked.

The disclosure further relates to a motor vehicle, in particular a multi-track passenger car, having a support frame, a first wheel module which is connected to the support frame and can be designed and developed as described above, and a second wheel module which is offset in the transverse direction relative to the first wheel module and can be designed and developed as described above, wherein the first wheel module and the second wheel module can be actuated independently of one another. A further pair of wheel modules offset in the longitudinal direction can be provided, which can each be designed and developed as described above. This enables particularly high flexibility in the direction of travel of the motor vehicle and/or enables a particularly small turning radius.

BRIEF DESCRIPTION OF THE DRAWINGS

In the following, an exemplary embodiment of the disclosure is shown using three figures. In the figures.

DETAILED DESCRIPTION

Figure 1:
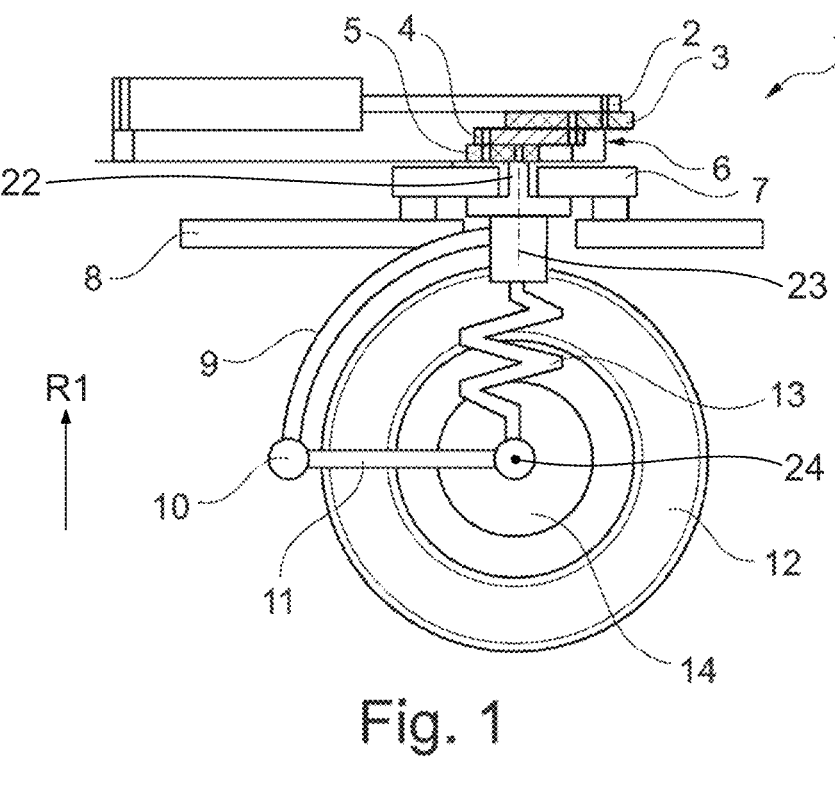
FIG. 1 shows a schematic representation of the principle of a wheel module according to the disclosure.

The wheel module 1 shown in FIG. 1 for a motor vehicle designed as a multi-track passenger car has a steering actuator 2 in the form of a linear actuator. As can be seen from this view, a main lever 3 is connected to the steering actuator 2, an intermediate lever 4 is connected thereto, and a steering lever 5 is connected to the rotatable steering rod. These three levers 3, 4, 5 form the steering lever assembly 6. The steering lever assembly 6 can be directly or indirectly rotatably mounted on a steering head bearing 7 on a support frame 8 of the motor vehicle. Furthermore, a wishbone 9 is provided which is connected to a linkage point 10. A rocker 11 is pivotably connected to the linkage point 10, wherein the rocker 11 is articulated and coaxially connected to a wheel 12 at its other end. A shock absorber 13 is attached to the wheel 12 and/or to the rocker 11 and a suspension spring is attached directly or indirectly to the wheel, which is attached at the other end thereof to the steering lever arrangement 6 and/or to the wishbone 9. The wheel 12 can in particular be driven and/or braked by a wheel hub drive 14. As shown in FIG. 1, the steering lever 5, the intermediate lever 4, the main lever 3, and the steering actuator 2 are stacked axially in succession relative to a radial direction R1 of the wheel 12. It could also be stated that these same components are stacked vertically above the wheel 12.

Figure 2:
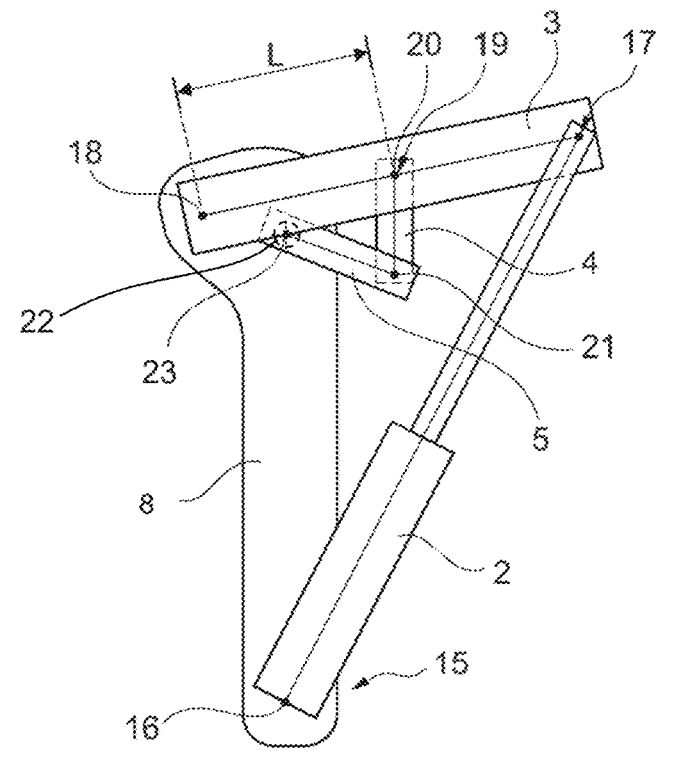
FIG. 2 shows a plan view of the steering lever assembly of the wheel module according to the disclosure.
Figure 4:
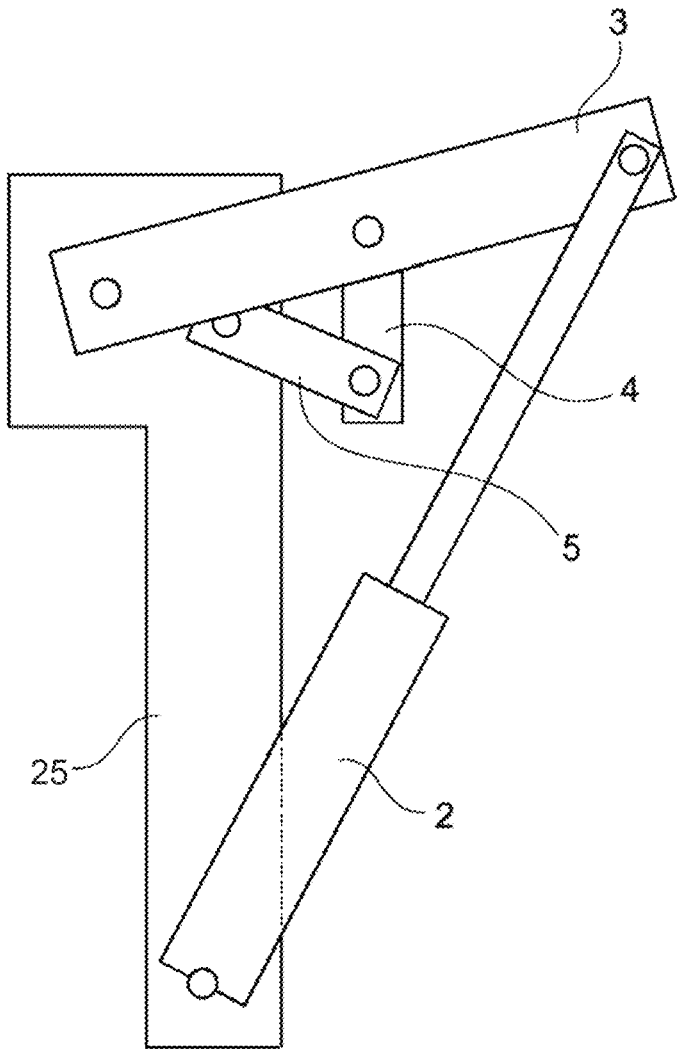
FIG. 4 shows a plan view of the steering lever assembly of the wheel module according to the disclosure.

Reference is now also made to FIG. 2 for a more detailed explanation of the steering lever assembly 6. The steering lever assembly 6 consists of the main lever 3, the intermediate lever 4 and the steering lever 5. The steering actuator 2 is rotatably connected at one distal end 15 to the support frame 8 at a connection point 16 at least indirectly. The connection point 16 can remain at a fixed position on the support frame 8 during actuation of the steering actuator 2. It is also conceivable to connect the steering actuator to another component 25 of the vehicle (as shown in FIG. 4). Furthermore, the steering actuator 2 is connected at its other end to the main lever 3 via a first connection area 17.

The main lever 3 is also connected in a stationary manner to the main frame 8 via a second connection area 18 so that it can rotate at least indirectly. Furthermore, the main lever 3 has an axis of rotation 19 between the first and the second connection region 17, 18, wherein the intermediate lever 4 is connected to this axis of rotation 19. This means that the intermediate lever is connected to the main lever 3 at a connection point 20 along the axis of rotation 19. The position of the axis of rotation 19 is defined using a lever distance L from the axis of rotation 19 to the second connection area 18. Due to the offset connection of the intermediate lever 4, a transmission or reduction between the movement from the main lever 3 to the steering lever 5 can be achieved via the lever distance L. The smaller the lever distance L selected, the larger the transmission ratio.

The intermediate lever 4 is pivotably connected to the steering lever 5 via the connection 21 and transmits the pivoting movement of the main lever 3 to the steering lever 5. The steering lever 5 is connected in a non-rotatable manner to the steering axle 22 of the wheel 12. The steering axle 22 defines a steering axis 23 that extends orthogonally relative to a rotational axis 24 of the wheel 12. It could be stated that the steering lever 5, the intermediate lever 4, the main lever 3, and the steering actuator 2 are stacked axially relative to the steering axis 23.

The linear movement of the steering actuator 2 is converted into a pivoting movement of the main lever 3 and transmitted to the steering lever 5 via the intermediate lever 4, as a result of which the latter performs a pivoting movement. The pivoting movement of the steering lever 5 causes the wheel module 1 to turn in.

Figure 3:
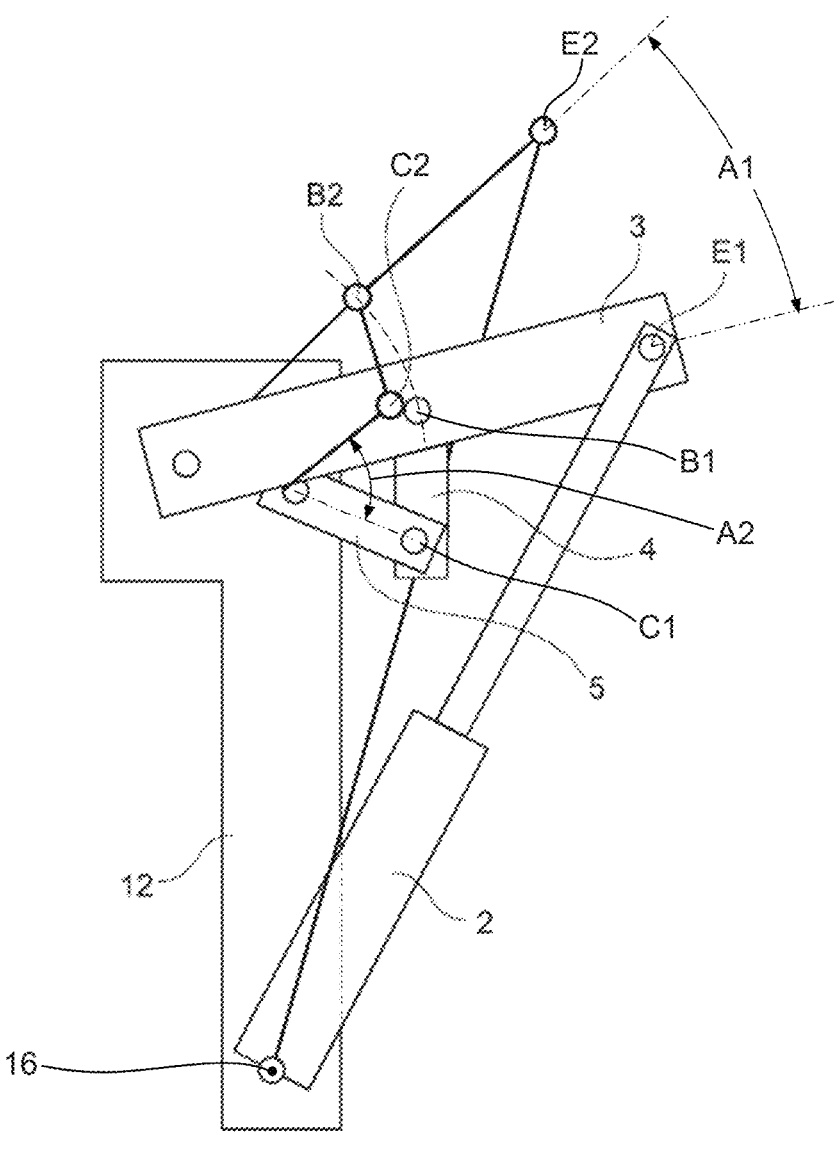
FIG. 3 shows the steering lever assembly of the wheel module according to the disclosure in several states.

FIG. 3 shows the steering lever assembly 6 of the wheel module 1 in several states that are achieved via linear actuation of the steering actuator 2. Based on the selected arrangement of the levers 3, 4, 5, linear actuation of the steering actuator 2 causes a first angular movement A1 of the main lever 3 from the end position E1 to the end position E2 which causes a resultant angular movement of the intermediate lever 4 from a position B1 to a position B2, which, in turn causes a resultant second angular movement A2 of the steering lever 5 from a position C1 to a position C2 that is greater than the first angular movement A1. As a result of the linear actuation of the steering actuator 2 and the angular movement of the main lever 3, pivoting of an entirety of the steering actuator 2 about the connection point 16 occurs. In an example embodiment, an angular movement of the main lever by about 90° yields a corresponding angular movement of the steering lever 5 of 1550.

LIST OF REFERENCE SYMBOLS

1 Wheel module
2 Steering actuator
3 Main lever
4 Intermediate lever
5 Steering lever
6 Steering lever assembly
7 Steering head bearing
8 Support frame
9 Wishbone
10 Steering point
11 Rocker
12 Wheel
13 Shock absorber
14 Wheel hub drive
15 Distal end
16 Connection point 17 First connection area
18 Second connection area
19 Axis of rotation
20 Connection point
21 Connection
22 Steering axle
23 Steering axis
24 Rotational axis of wheel
25 Another component of the vehicle
L Lever distance
E1 End position of main lever
E2 End position of main lever
B1 Position of intermediate lever
B2 Position of intermediate lever
C1 Position of steering lever
C2 Position of steering lever
A1 First angular movement
A2 Second angular movement
R1 Radial direction of wheel

The invention claimed is:

1. A wheel module of a motor vehicle, comprising:
a wheel,
a steering lever assembly configured for transferring a steering movement to the wheel,
a linear actuator configured for introducing the steering movement is connected to the steering lever assembly, the linear actuator having a rotatably mounted first end, and
the steering lever assembly comprising:
    a main lever having:
        a first end rotatably mounted to one of a support frame or another component of the motor vehicle, and
        a second end rotatably mounted to a second end of the linear actuator, and
    a steering lever:
        rotatably connected to the main lever via an intermediate lever, and
        non-rotatably mounted to a steering axle, the steering axle different than the another component of the motor vehicle, and
    actuation of the linear actuator moves:
        the main lever, intermediate lever, and the steering lever so as to rotate the wheel via rotation of the steering axle, and
        the second end of the linear actuator pivots about the first end of the linear actuator.

2. The wheel module according to claim 1, wherein the first end of the linear actuator is rotatably mounted on the one of the support frame or the another component of the motor vehicle.

3. The wheel module according to claim 1, wherein the linear actuator is configured as an electromechanical actuator.

4. The wheel module according to claim 1, wherein the main lever further comprises an axis of rotation arranged between the first end of the main lever and the second end of the main lever, and the intermediate lever is connected to the axis of rotation.

5. The wheel module according to claim 1, wherein the steering lever is:
rotatably connected to the intermediate lever, and
non-rotatably connected to a steering axle of the wheel.

6. The wheel module according to claim 1, wherein an electrically drivable wheel hub drive is arranged on or in the wheel.

7. The wheel module according to claim 1, wherein the first end of the main lever and the first end of the linear actuator are rotatably mounted on the support frame.

8. The wheel module according to claim 1, wherein the steering axle is rotatably actuated by the steering lever during actuation of the linear actuator so as to rotate the wheel, and a steering axis defined by the steering axle extends orthogonally relative to a rotational axis of the wheel.

9. A wheel module of a motor vehicle, comprising:
a steering lever assembly having:
    a main lever configured to be rotatably connected to the motor vehicle,
    an intermediate lever rotatably connected to the main lever,
    a steering lever:
        pivotably connected to the intermediate lever, and
        configured to be non-rotatably attached to a steering axle of a wheel of the motor vehicle so that rotation of the steering lever is configured to rotate the wheel, and
a linear actuator configured for actuating the steering lever assembly, the linear actuator having:
    a first end configured to be rotatably mounted to the motor vehicle via a connection point, the connection point remaining at a fixed position on the motor vehicle during actuation of the linear actuator, and
    a second end configured to be rotatably mounted to the steering lever assembly, and
actuation of the linear actuator causes angular displacement of the main lever and pivoting of the second end of the actuator about the connection point.

10. The wheel module according to claim 9, wherein the steering lever and the intermediate lever define a pivotable connection that moves relative to the main lever when the steering lever assembly is actuated by the linear actuator.

11. The wheel module according to claim 9, wherein the main lever is configured to be rotatably connected to the motor vehicle at a first location on the motor vehicle, and the linear actuator is configured to be rotatably connected to the motor vehicle at a second location on the motor vehicle.

12. The wheel module according to claim 11, wherein a first end of the main lever is rotatably connected to the motor vehicle at the first location and a second end of the main lever is rotatably connected to the second end of the linear actuator.

13. The wheel module of claim 12, wherein the intermediate lever is rotatably connected to the main lever at a medial location on the main lever between the first end of the main lever and the second end of the main lever.

14. A wheel module of a motor vehicle, comprising:
a steering lever assembly having:
    a main lever configured to be rotatably connected to the motor vehicle,
    an intermediate lever rotatably connected to the main lever,
    a steering lever:
        pivotably connected to the intermediate lever, and
        configured to be non-rotatably attached to a steering axle of a wheel of the motor vehicle so that rotation of the steering lever is configured to rotate the wheel, and
a linear actuator configured for actuating the steering lever assembly, the linear actuator having:
    a first end configured to be rotatably mounted to the motor vehicle via a connection point, the connection point remaining at a fixed position on the motor vehicle during actuation of the linear actuator, and a second end configured to be rotatably mounted to the steering lever assembly, and the main lever, the intermediate lever, and the steering lever stacked axially relative to a steering axis, the steering axis: i) defined by the steering axle, and ii) configured to extend orthogonally relative to a rotational axis of the wheel.

15. The wheel module according to claim 14, wherein the linear actuator, the main lever, the intermediate lever, and the steering lever are stacked axially relative to the steering axis.

16. The wheel module according to claim 14, wherein the main lever, the intermediate lever, and the steering lever are stacked axially, relative to the steering axis, above the wheel.

17. The wheel module according to claim 14, wherein:

a first angular movement of the main lever from a first end position to a second end position via actuation of the linear actuator causes a corresponding second angular movement of the steering lever, the second angular movement greater than the first angular movement.

18. The wheel module according to claim 17, wherein, during the first angular movement, the linear actuator pivots about the first end.

* * * * *